United States Patent [19]

Neki et al.

[11] Patent Number: 4,517,909
[45] Date of Patent: May 21, 1985

[54] SEWING MACHINE HAVING A DIGITAL COMMAND CIRCUIT

[75] Inventors: Shigeo Neki, Osaka; Nozomu Shinozaki; Takashi Dohi, both of Hirakata, all of Japan

[73] Assignee: Matsushita Electric Industrial Company, Limited, Japan

[21] Appl. No.: 387,433

[22] Filed: Jun. 11, 1982

[30] Foreign Application Priority Data

Jun. 15, 1981 [JP] Japan ................... 56-91875

[51] Int. Cl.³ .................. D05B 69/18; D05B 69/24
[52] U.S. Cl. ....................... 112/275; 318/551
[58] Field of Search ............ 112/275, 277, 300, 220, 112/221; 318/305, 551, 318, 341

[56] References Cited

U.S. PATENT DOCUMENTS

| | | |
|---|---|---|
| 2,978,693 | 4/1961 | Champion . |
| 3,268,788 | 8/1966 | Branco . |
| 3,514,685 | 5/1970 | Burgess . |
| 3,543,116 | 11/1970 | Haner et al. . |
| 3,621,352 | 11/1971 | Dinger . |
| 3,731,301 | 5/1973 | Davis . |
| 4,040,508 | 8/1977 | Sunada . |
| 4,052,646 | 10/1977 | Massey et al. . |
| 4,080,914 | 3/1978 | Ishida et al. .................. 112/277 |
| 4,104,978 | 8/1978 | Takahashi . |
| 4,130,785 | 12/1978 | Penet . |
| 4,139,808 | 2/1979 | Matsumura . |
| 4,153,863 | 5/1979 | Schachte et al. . |
| 4,173,193 | 11/1979 | Morinaga et al. .............. 112/300 X |
| 4,227,137 | 10/1980 | Hartman . |
| 4,278,925 | 7/1981 | Minakuchi . |
| 4,298,832 | 11/1981 | Acker et al. . |

FOREIGN PATENT DOCUMENTS

| | | |
|---|---|---|
| 650634 | 2/1963 | Belgium . |
| 2412895 | 3/1974 | Fed. Rep. of Germany . |
| 1453454 | 10/1965 | France . |

*Primary Examiner*—Peter Nerbun
*Attorney, Agent, or Firm*—Lowe, King, Price & Becker

[57] ABSTRACT

A sewing machine comprises a pedal position detector for detecting the position of the manually operated foot pedal of the machine and generating therefrom a pedal position indicating digital signal comprising a set of a predetermined number of binary digits. The sets of binary digits are organized into a plurality of command signals each comprising a plurality of sets of binary digits corresponding to adjacent positions of the pedal for indicating a specified operating condition of the sewing machine. The sewing machine is operated in response to the command signal.

13 Claims, 4 Drawing Figures

SEWING MACHINE HAVING A DIGITAL COMMAND CIRCUIT

BACKGROUND OF THE INVENTION

The present invention relates to sewing machine speed control systems, and in particular to a digital sewing machine speed control system in which the operating condition of the machine is controlled in response to a command signal derived from a plurality of binary digits indicating the position of a foot pedal.

Conventional sewing machine speed control systems include a circuit that generates a speed setting signal in response to the amount of depression of an operator-controlled foot pedal. The speed setting signal is typically generated by a magnetic sensor located with respect to a permanent magnet which is mounted for movement with the foot pedal, whereby the depression of the pedal results in a variation in the output of the magnetic sensor.

However, the conventional systems are not satisfactory in that the pedal stroke versus speed characteristic of the machine for various sewing operations is not optimized from the standpoint of human engineering. Furthermore, the conventional systems are not readily adapted for application to microcomputer technology.

SUMMARY OF THE INVENTION

It is therefore an object of the present invention to provide a sewing machine control system which is optimized for human engineering purposes and which is readily adapted for microcomputer applications at lower cost.

The sewing machine embodying the present invention comprises a pedal position detector for detecting the position of the manually operated foot pedal of the machine and generating therefrom a pedal position indicating signal comprising a set of a predetermined number of binary digits. The sets of binary digits are organized into a plurality of command signals each comprising a plurality of sets of binary digits corresponding to adjacent positions of the pedal for indicating a specified operating condition of the sewing machine. The sewing machine is operated in response to the command signal.

According to a specific aspect of the invention, the digital signal is organized by a read only memory storing a set of speed control digital signals each of which is read therefrom in response to each set of binary signals. The sets of binary signals are also converted into into a plurality of operating command signals. The system may further include a needle-up position detector for detecting a needle-up position of the sewing machine and a thread cutter responsive to there being the simultaneous presence of the needle-up position signal and a corresponding one of the command signal for cutting the thread of the machine. A needle-down position detector may also be included for detecting a needle-down position of the sewing machine to stop the sewing machine in response to there being the simultaneous presence of the needle-down position signal and a corresponding one of the command signals.

BRIEF DESCRIPTION OF THE DRAWINGS

The present invention will be described in further detail with reference to the accompanying drawings, in which.

DETAILED DESCRIPTION

Figure 1:
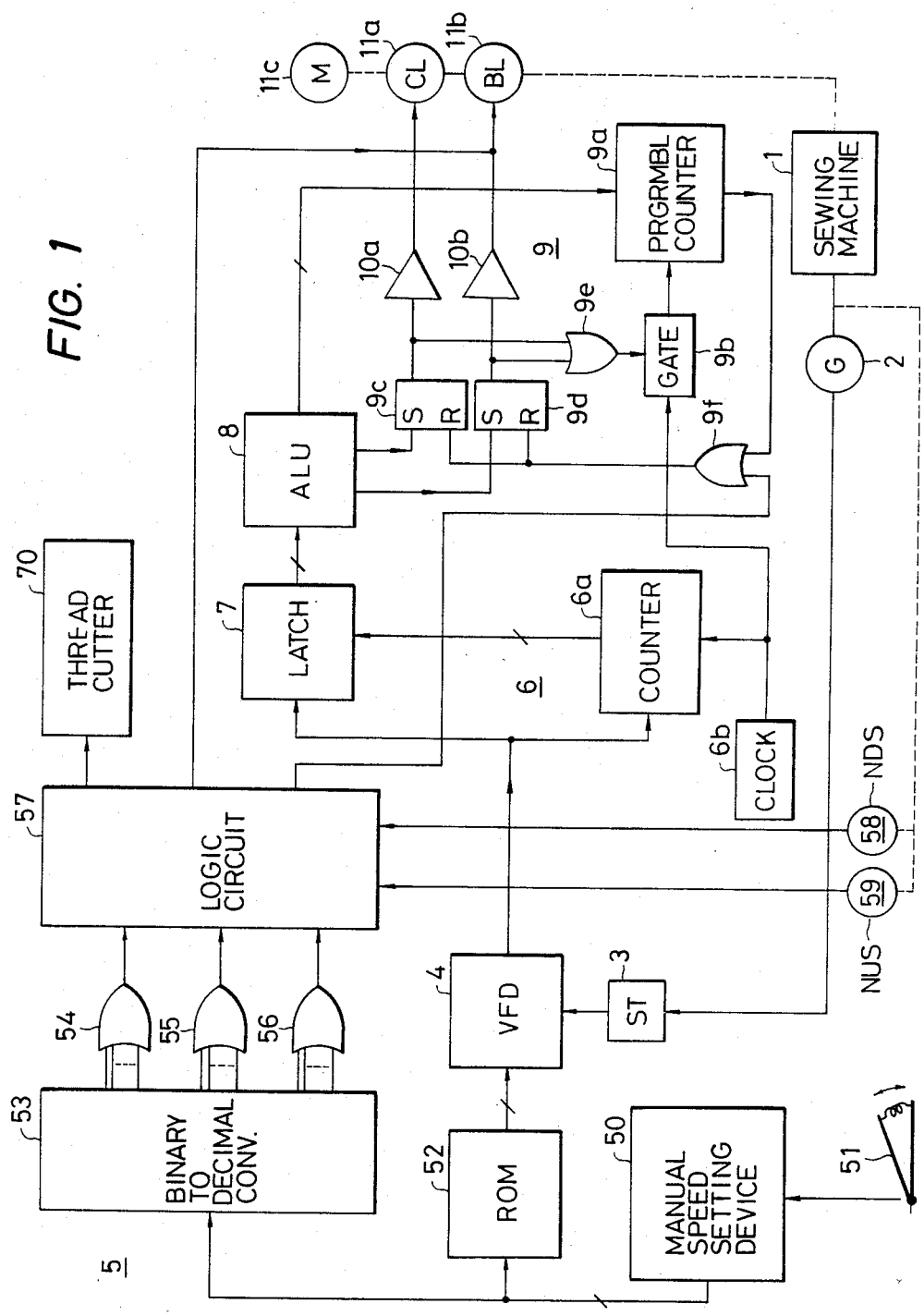
FIG. 1 is a block diagram of the speed control system according to the invention.

Referring now to FIG. 1, a sewing machine speed control system of the invention is schematically illustrated. The system includes a sewing machine speed setting circuit 5 which provides a digital speed setting signal as a function of the amount of operator's foot pedal depression and as a function of soft-start speed setting.

Before describing the detail of the speed setting circuit the speed control circuit of the sewing machine will be first described. A tachogenerator 2 of a conventional construction has its rotor operatively connected to the driven shaft of the sewing machine 1 which is driven by a motor 11c. This motor has a driving shaft which is coupled to the driven shaft of the sewing machine by a pulley-and-belt arrangement when a clutch actuating coil 11a is energized. The rotor shaft of motor M is decoupled from the sewing machine by a brake actuating coil 11b which subsequently applies a brake to the driven shaft of the sewing machine. Thus the speed of the sewing machine is controlled by the varying period of energization of clutch and brake operating coils 11a and 11b. Since the details of the motor construction is well known in the art, FIG. 1 only illustrates the associated parts in schematic form for the sake of simplicity. The tachogenerator 2 generates a train of 60 equally spaced apart impulses per revolution when the rotor turns at a speed of 200 rpm. The generated impulses are shaped into sharply defined, rectangular pulses by a wave shaping circuit 3, preferably a Schmitt trigger, and applied to a variable frequency divider 4. The frequency divider 4 comprises a programmable counter connected to the Schmitt trigger 3 for dividing the frequency of the pulses therefrom at a variable ratio of input to output frequency in response to a speed control binary code. The interval between successive pulses from the frequency divider 4 is measured by a counter means 6 comprising a binary counter 6a which is arranged to be enabled in response to each pulse from the divider 4 for counting clock pulses from a clock source 6b and reset in response to a subsequent divider output pulse. The counted clock pulses are presented in the form of a 4-bit binary code to a latch 7 in response to the occurrence of each divider output pulse. The latched binary code will then be read in response to the next output of the frequency divider into an arithmetic unit 8. The arithmetic unit 8 may be a digital function generator comprising a memory. The data stored in the memory of unit 8 represents a predetermined transfer function describing the relationship between the interval measured by period counter 6a and a predicted pulse duration in which either one of coils 11a and 11b is to be subsequently energized. As will be described in detail hereinbelow, arithmetic unit 8 provides an acceleration or deceleration signal depending on whether the measured pulse interval is greater or smaller than a value determined by the transfer function and provides an output in the form of binary signals representing the predicted pulse duration to a pulse generator circuit 9.

More specifically, the transfer function of the arithmetic unit is described as $T=At-B$ where T represents the duration in which the coil 11a or 11b is to be subsequently energized and t represents the interval detected by the period detector 6, and A and B are constants. Constant A is a factor that determines the gain of the closed loop of the speed control system, and B is appropriately determined in relation to a desired minimum speed of the sewing machine when the frequency division factor is unity.

The pulse generator 9 comprises a programmable counter 9a which presets its full count value to the binary signals from the arithmetic unit 8 and is clocked by source 6b through a gate 9b to increment its count to generate an output when the preset count is reached. The pulse generator circuit 9 further includes flip-flops 9c and 9d and an OR gate 9e. Flip-flops 9c and 9d respond respectively to acceleration and deceleration signals from arithmetic unit 8 to activate coils 11a and 11b through linear amplifiers 10a and 10b. The outputs of flip-flops 9c and 9d are coupled via OR gate 9e to the control terminal of gate 9b to pass clock pulses from source 6b to programmable counter 9a. Gate 9b is thus open in response to each of the acceleration and deceleration signal to cause programmable counter 9a to be incremented. On full count, the programmable counter 9a resets flip-flops 9c and 9d by applying its output through an OR gate 9f to the reset inputs of these flip-flops. Thus, flip-flops 9c and 9d each remain in a "1" state for a duration determined by the arithmetic unit 8, and solenoid clutch and brake 11a and 11b are energized for corresponding durations.

For purposes of explanation it is assumed that the tachogenerator 2 generates 60 impulses per revolution for a sewing machine speed of 200 rpm for an input to output frequency ratio of 1:1. The detected pulse interval t will then be 5 milliseconds which corresponds to the T-value of 2 milliseconds. This means that clutch coil 11a is energized with a duty cycle of 40% and the sewing machine is run at a constant speed.

If sewing machine speed decreases in response to an increase in sewing load, the measured pulse interval t will increase by an amount determined by the transfer function. An acceleration signal is generated from arithmetic unit 8 to trigger flip-flop 9c, so that clutch coil 11a is energized with a duty cycle greater than 40%. Since the sewing machine speed is proportional to an average value of successive energization times of coils 11a and 11b, an increase in the duty cycle results in acceleration of the sewing machine until it reaches 200 rpm. Conversely, a decrease in sewing machine load results in a decrease in duty cycle for clutch energization until the sewing machine speed decreases to 200 rpm. If the machine speed has further increased beyond 250 rpm so that the measured pulse interval is 4 milliseconds, a deceleration signal is generated to trigger the flip-flop 9d to energize brake coil 11b. As a result, the sewing machine speed rapidly decreases to 200 rpm.

If higher speed operation is desired the frequency dividing factor is increased to an appropriate value. For example, a dividing factor of 2 will result in the measured pulse interval t being doubled with a corresponding increase in clutch duty cycle and the sewing machine speed increases to 400 rpm. With the system so stabilized, the pulse interval t and hence the duty cycle assumes the same value as when the sewing machine was previously run at 200 rpm for a unity frequency division ratio, so that the measured interval t and duty cycle values are maintained constant once the system is stabilized to a new division ratio. The operating speed of sewing machine 1 can thus be varied at increments of an integral multiple of 200 rpm from the minimum speed of 200 rpm.

Figure 2:
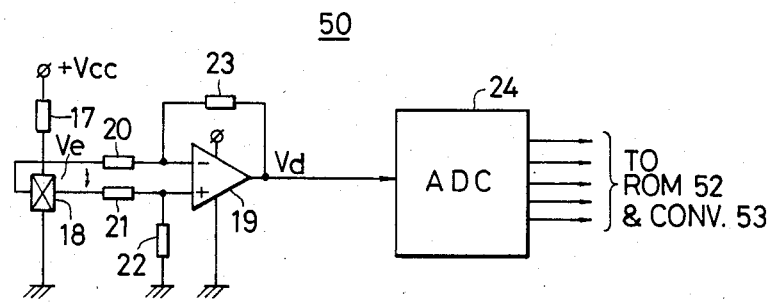
FIG. 2 is an illustration of a typical example of the circuit for generating a pedal position indicating digital signal.

According to the present invention, the speed setting circuit 5 comprises a digital speed setting device 50 which is manually operated in response to the operator's foot pedal 51 which is pivotally movable between a backwardly fully depressed position to a forwardly fully depressed position with a neutral position therebetween. Briefly described, the speed setting device 50 includes a permanent magnet, not shown, mounted for rotation with the foot pedal 51 and a magnetic sensor stationarily mounted with respect to the magnet to generate a voltage signal representing the orientation of the foot pedal. A typical example of circuits for generating position indicating signals is shown in FIG. 2 in which a magnetoresistive element 18 is supplied with a current from a voltage source Vcc through a resistor 17. The voltage developed in the element 18 is coupled to the inverting and noninverting inputs of a differential amplifier formed by an operational amplifier 19, and resistors 20 to 23. The output of the differential amplifier is coupled to an analog-digital converter 24 where the input voltage is converted to a 5-bit binary code. The 5-bit binary signal is applied to a read only memory 52 and also to a binary-to-decimal converter 53.

The 5-bit binary codes from "00000" to "11111" are organized so that binary codes "00000" to "00101" (corresponding to decimal numbers 0 to 5) are assigned to six backward pedal positions for signifying that the sewing machine is to be operated at a low speed for thread cutting operation. The binary codes "00110" to "01100" (corresponding to decimal numbers 6 to 12) are assigned to seven pedal positions for signifying that the pedal is in a neutral position for stopping the sewing machine. The binary codes "01101" to "11111" are assigned to nineteen forward pedal positions for signifying that the sewing machine is to operated at variable high speeds.

Figure 3:
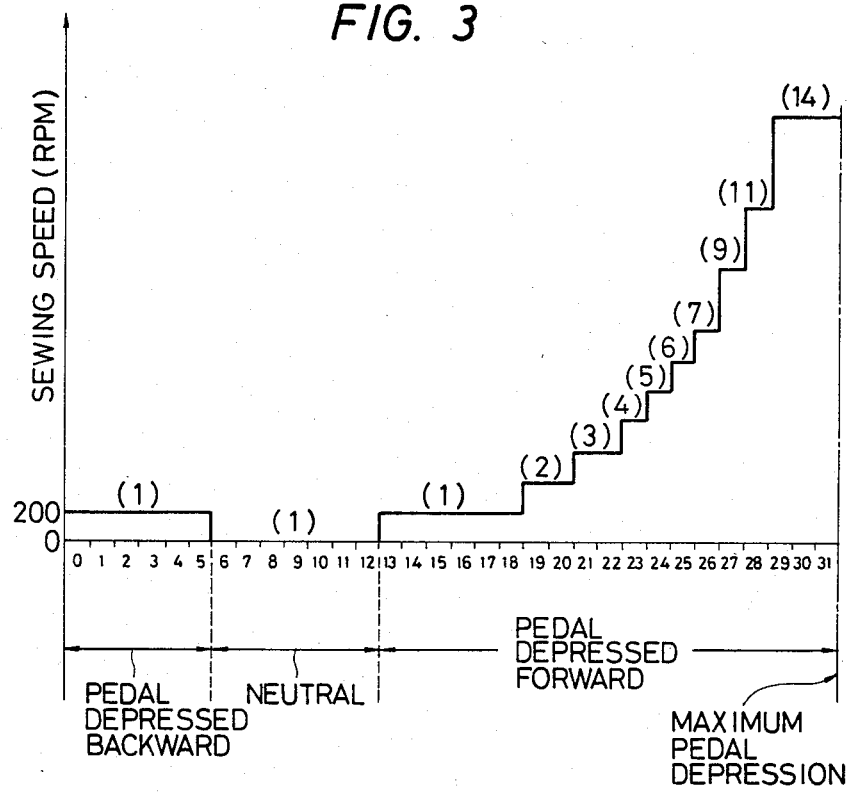
FIG. 3 is a graphic illustration of the sewing speed as a function of pedal stroke represented by digital values.

Speed control binary codes are stored in the read only memory 52 each of which is read out of the memory into the variable frequency divider 4 in response to a pedal position binary code from the analog-digital converter 24 to set the frequency dividing factor of the divider 4 according to the amount of pedal depression. As graphically shown in FIG. 3 in which the frequency dividing factors are designated by decimal numbers in parentheses, data representing a unity frequency dividing factor is stored in cell locations of the memory 52 which are addressed by pedal position binary codes "00000" to "10010" (corresponding to decimal numbers 0 to 18), so that the sewing machine speed is set at a predetermined low speed, typically at 200 rpm. Data representing frequency dividing factors 2 to 14 are stored in cell locations addressed by binary codes "10011" to "11111" (corresponding to decimal numbers 19 to 31) to operate the machine at a variable speed which is an integral multiple of 200 rpm.

The binary-to-decimal converter 53 provides conversion of binary codes "00000" to "11111" which are supplied from ADC 24 of speed setting device 50 to decimal numbers 0 to 31. The decimal outputs 0 to 5 are coupled to a "thread cutter" OR gate 54 and the decimal outputs 6 to 12 are applied to a "neutral position"

OR gate 55, the decimal outputs 13 to 31 being applied to a "variable speed" OR gate 56. The outputs of the OR gates 54 to 56 are connected to a logic circuit 57. The speed setting circuit 5 further includes a needle-down position detector 58 and a needle-up position detector 59 which are operatively coupled to the armshaft of the sewing machine to detect its needle-down and needle-up positions to generate corresponding needle position signals for application to the logic circuit 57.

Figure 4:
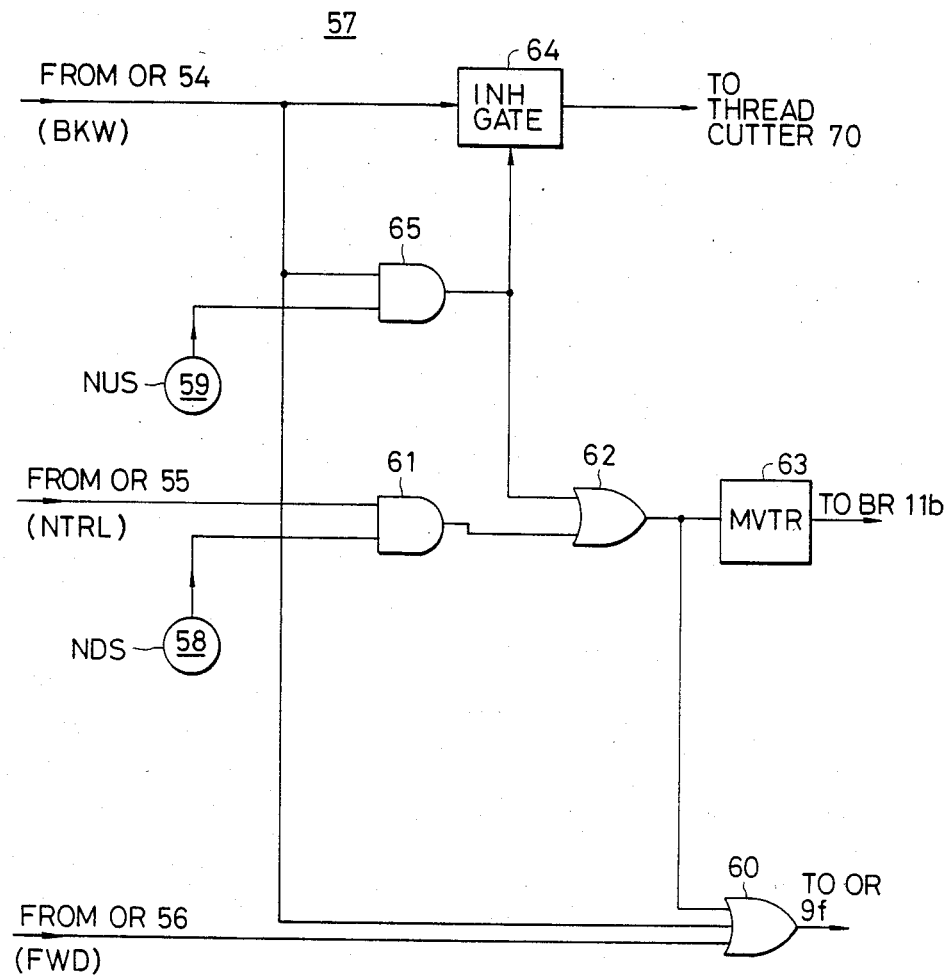
FIG. 4 is a circuit diagram of the logic circuit of FIG. 1.

Details of the logic circuit 57 are illustrated in FIG. 4. When the foot pedal 51 is depressed forward from the neutral position, a speed setting binary signal is supplied from the setting device 50 to binary-to-decimal converter 53 and the OR gate 56 will generate an output which is supplied through an OR gate 60 to the OR gate 9f to reset the flip-flops 9c and 9d.

The speed setting binary signal is also supplied to ROM 52 and a corresponding speed control datum is read out of the memory 52 into the variable frequency divider 4 so that the sewing machine is operated at a variable speed depending on the amount of forward depression of the foot pedal 51.

When the foot pedal 51 is returned to the neutral position, the OR gate 55 will generate an output which is fed to an input of an AND gate 61 which takes another input from the needle-down position sensor 58. Therefore, when the needle subsequently comes to the downward position, the AND gate 61 generates an output which is passed through an OR gate 62 to a monostable multivibrator 63 and also to the OR gate 60 to reset the flip-flops 9c and 9d. The output of the monostable multivibrator 63 is connected to the solenoid brake 11b to briefly energize it for stopping the sewing machine 1.

If the foot pedal is depressed backward for thread cutting operation, the OR gate 54 generates an output which is applied through an inhibit gate 64 to a thread cutter 70 and also to an input of an AND gate 65 which takes another input from the needle-up position detector 59.

ROM 12 is addressed and generates a low speed command signal which presets the variable frequency divider 4 to the lowermost speed value. The sewing speed thus decreases to 200 rpm to allow thread cutter 70 to be energized to cut off the needle thread. When the needle comes to the upward position, the AND gate 65 is activated. The output of AND gate 65 is used to close the gate 64 to de-energize the thread cutter 70 and reset the flip-flops 9c and 9d through OR gates 62 and 60 to energize the monostable multivibrator 63 for operating the solenoid brake 11b to stop the machine.

By appropriately organizing the binary codes so that a plurality of adjacent bit positions of the pedal position indicating signal is assigned to a particular function and a sewing speed, pedal strokes for various sewing operations and the pedal-stroke versus speed characteristic can be optimized independently for human engineering.

Various modifications are apparent to those skilled in the art without departing from the scope of the invention which is only limited by the appended claims. For example, the pulse shaping circuit 3, variable frequency divider 4, counter means 6, latch 7, arithmetic unit 8, pulse generator means 9, part of the manual speed setting device 50, read only memory 52, and logic circuit 57 are economically realized by microcomputer.

What is claimed is:

1. A sewing machine having a manually operated pedal, comprising:
    position detection means for detecting the position of said pedal and generating therefrom a pedal position indicating digital signal;
    means for organizing a plurality of said digital signals which are derived respectively from adjacent positions of said pedal and generating therefrom a command signal indicating a specified operating condition of the sewing machine; and
    means for controlling said sewing machine in accordance with said command signal;
    wherein said organizing means comprises means for converting the position indicating digital signals to corresponding mode command signals and memory means for storing a set of speed command digital signals each of which is read out of the memory means in response to said position indicating digital signals for controlling the speed of said sewing machine at speeds associated with said mode command signals.

2. A sewing machine as claimed in claim 1, wherein said position detecting means comprises means for converting an analog signal to a digital signal.

3. A sewing machine as clamed in claim 1, wherein said specified operating condition is a stopping operation of the sewing machine.

4. A sewing machine as claimed in claim 1 or 3, wherein said specified operating condition is a thread cutting operation.

5. A sewing machine as claimed in claim 1, wherein said specified operating condition is a low speed condition of the sewing machine.

6. A sewing machine as claimed in claim 1, wherein said specified operating condition is a maximum speed operation of the sewing machine.

7. A sewing machine as claimed in claim 1, further comprising means for detecting a needle-up position of the sewing machine and generating therefrom a needle-up position signal and a thread cutter responsive to there being the simultaneous presence of said needle-up position signal and one of said mode command signals for cutting the thread of the machine.

8. A sewing machine as claimed in claim 1, further comprising means for detecting a needle-down position of the sewing machine and generating therefrom a needle-down position signal, and means for stopping the sewing machine in response to there being the simultaneous presence of said needle-down position signal and one of said mode command signals.

9. A sewing machine as claimed in claim 1, further comprising a tachogenerator for generating a pulse signal having pulses at a frequency corresponding to the speed of rotation of an armshaft of said sewing machine, a digitally programmable variable frequency divider for dividing the frequency of said pulse signal as a function of a digital program input signal applied thereto, means for generating an acceleration signal or a deceleration signal in response to the output of said frequency divider, a motor, a clutch-and-brake arrangement for coupling an output shaft of said motor to said armshaft in response to said acceleration signal and decoupling said output shaft from said armshaft in response to said deceleration signal, wherein said organizing means comprises means for converting said position indicating digital signals into corresponding mode command signals and means for converting said position indicating digital signals into speed command digital signals corresponding to the mode command signals and for applying the speed command digital signal to said frequency divider as said digital program input signal.

10. A sewing machine as claimed in claim 9, further comprising means for detecting a needle-up position of the sewing machine and generating therefrom a needle-up position signal and a thread cutter responsive to there being the simultaneous presence of said needle-up position signal and one of said mode command signals for cutting the thread of the machine.

11. A sewing machine as claimed in claim 9, further comprising means for detecting a needle-down position of the sewing machine and generating therefrom a needle-down position signal, and means for stopping the sewing machine in response to there being the simultaneous presence of said needle-down position signal and one of said mode command signals.

12. A sewing machine as claimed in claim 1, wherein said position detecting means comprises means including a magnetoresistance element for generating an analog signal representing the angular position of said pedal with respect to a reference position and an analog-to-digital converter for converting said analog signal into said position indicating digital signal.

13. A sewing machine as claimed in claim 10, wherein said position detecting means comprises means including a magnetoresistance element for generating an analog signal representing the angular position of said pedal with respect to a reference position and an analog-to-digital converter for converting said analog signal into said position indicating digital signal.

* * * * *